United States Patent
Kawaguchi et al.

(10) Patent No.: US 9,057,435 B2
(45) Date of Patent: Jun. 16, 2015

(54) VEHICLE STARTUP CONTROL DEVICE AND STARTUP CONTROL METHOD

(71) Applicants: JATCO LTD, Fuji-shi, Shizuoka (JP); NISSAN MOTOR CO., LTD., Yokohama-shi, Kanagawa (JP)

(72) Inventors: Takateru Kawaguchi, Susono (JP); Akito Suzuki, Tokyo (JP); Aki Hayakawa, Sagamihara (JP); Yasuhiro Endo, Isehara (JP); Hiroshi Sekiya, Atsugi (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/388,652

(22) PCT Filed: Feb. 22, 2013

(86) PCT No.: PCT/JP2013/054560
§ 371 (c)(1),
(2) Date: Sep. 26, 2014

(87) PCT Pub. No.: WO2013/145985
PCT Pub. Date: Oct. 3, 2013

(65) Prior Publication Data
US 2015/0046051 A1    Feb. 12, 2015

(30) Foreign Application Priority Data
Mar. 29, 2012    (JP) .................... 2012-076225

(51) Int. Cl.
*F16H 61/14*    (2006.01)
*F16D 43/284*    (2006.01)

(52) U.S. Cl.
CPC ............ *F16H 61/143* (2013.01); *F16D 43/284* (2013.01)

(58) Field of Classification Search
CPC ... B60W 10/023; B60W 10/026; F16H 59/40; F16H 61/14; F16H 2061/145
USPC ........................................................ 701/67, 68
See application file for complete search history.

(56) References Cited

U.S. PATENT DOCUMENTS

| | | | |
|---|---|---|---|
| 2004/0144608 A1* | 7/2004 | Kobayashi et al. | 192/3.3 |
| 2005/0261111 A1* | 11/2005 | Kurogo et al. | 477/169 |
| 2009/0164078 A1* | 6/2009 | Oue et al. | 701/67 |
| 2011/0046861 A1* | 2/2011 | Moriyama et al. | 701/67 |
| 2011/0196590 A1 | 8/2011 | Ayabe et al. | |
| 2011/0231073 A1* | 9/2011 | Inuta et al. | 701/58 |

FOREIGN PATENT DOCUMENTS

| | | |
|---|---|---|
| JP | 2005-003193 A | 1/2005 |
| JP | 2006-002910 A | 1/2006 |
| JP | 2011-163398 A | 8/2011 |
| JP | 2011-202793 A | 10/2011 |
| JP | 2012-057670 A | 3/2012 |

* cited by examiner

*Primary Examiner* — Edwin A Young
(74) *Attorney, Agent, or Firm* — Foley & Lardner LLP (57) ABSTRACT

A start request detection unit detects a start request for a vehicle. A hydraulic pressure control circuit controls torque transmitted by a lock-up clutch by controlling an engagement force of the lock-up clutch. A rotation speed detection unit detects an output rotation speed of a torque converter. An engagement control unit issues an instruction to the hydraulic pressure control circuit such that the lock-up clutch is placed in slip engagement and is able to transmit the torque when the following conditions are both satisfied: a predetermined time period has elapsed since detection of the start request by the start request detection unit; and the output rotation speed has increased to a predetermined rotation speed or higher.

7 Claims, 8 Drawing Sheets

VEHICLE STARTUP CONTROL DEVICE AND STARTUP CONTROL METHOD

TECHNICAL FIELD

The present invention relates to a device and a method for controlling a start of a vehicle that performs slip control for a lock-up clutch when the vehicle starts.

BACKGROUND ART

JP2005-3193A describes a known technique to control a vehicle provided with a torque converter including a lock-up clutch so as to improve the torque transmission efficiency and fuel efficiency by performing slip control for the lock-up clutch when the vehicle starts.

When a progressive load of the vehicle is large, e.g., when a live load of the vehicle is large, while towing, and when starting on a climbing road, the lock-up clutch is subjected to an excessive load if the slip control for the lock-up clutch is performed whenever the vehicle starts. This gives rise to the possibility of deterioration in the driving performance because a torque capacity of the lock-up clutch becomes overabundant, an engine speed does not rapidly increase, and a sufficient driving force cannot be obtained. Also, the excessive load could possibly lower the durability of the lock-up clutch.

Such troubles may be avoided by starting in a converter state, in which the lock-up clutch is disengaged, when the vehicle is subjected to a large load. However, this gives rise to the problem that the engine speed rapidly increases and the fuel efficiency decreases when, for example, an accelerator pedal opening operated by a driver is large.

SUMMARY OF INVENTION

The present invention has been made in view of the above problems, and aims to provide a device and a method for controlling a start of a vehicle that can improve the driving performance even when the vehicle is subjected to a large load.

One aspect of the present invention is applied to a device for controlling a start of a vehicle in which an output of a driving force source is output from a transmission via a torque converter including a lock-up clutch. The device for controlling the start of the vehicle includes: a start request detection unit that detects a start request for the vehicle; a hydraulic pressure control circuit that controls torque transmitted by the lock-up clutch by controlling an engagement force of the lock-up clutch when the vehicle starts; a rotation speed detection unit that detects an output rotation speed of the torque converter; and an engagement control unit that issues an instruction to the hydraulic pressure control circuit such that the lock-up clutch is placed in slip engagement and is able to transmit the torque when the following conditions are both satisfied: a predetermined time period has elapsed since detection of the start request by the start request detection unit; and the output rotation speed has increased to a predetermined rotation speed or higher.

Another aspect of the present invention is a method for controlling a start of a vehicle in which an output of a driving force source is output from a transmission via a torque converter including a lock-up clutch. The method includes: a step of waiting for an elapse of a predetermined time period since detection of a start request for the vehicle; a step of waiting until an output rotation speed of the torque converter increases to a predetermined rotation speed or higher when the vehicle starts; a step of issuing an instruction to a hydraulic pressure control circuit such that the lock-up clutch is placed in slip engagement and is able to transmit torque when the following conditions are both satisfied: the predetermined time period has elapsed since detection of the start request for the vehicle; and the output rotation speed of the torque converter has increased to the predetermined rotation speed or higher; and a step of controlling the torque transmitted by the lock-up clutch placed in the slip engagement by controlling an engagement force of the lock-up clutch based on the instruction.

According to the above aspects, the hydraulic pressure control circuit is controlled such that the lock-up clutch is placed in the slip engagement and is able to transmit the torque when the output rotation speed (a turbine rotation speed) of the torque converter has become equal to or higher than the predetermined rotation speed after the predetermined time period has elapsed since detection of the start request for the vehicle. Through this control, by performing control such that the lock-up clutch does not transmit the torque until the turbine rotation speed becomes equal to or higher than a predetermined rotation, the lock-up clutch is controlled to transmit the torque after a driving force of the driving force source starts to be transmitted in a converter state. Consequently, a timing at which the torque starts to be transmitted occurs under a substantially fixed condition, regardless of the state of the vehicle load. Therefore, torque of the driving force source can be sufficiently transmitted, and driving performance can be improved.

An embodiment and advantages of the present invention will be described below in detail with reference to the attached drawings.

DESCRIPTION OF EMBODIMENTS

Figure 1:
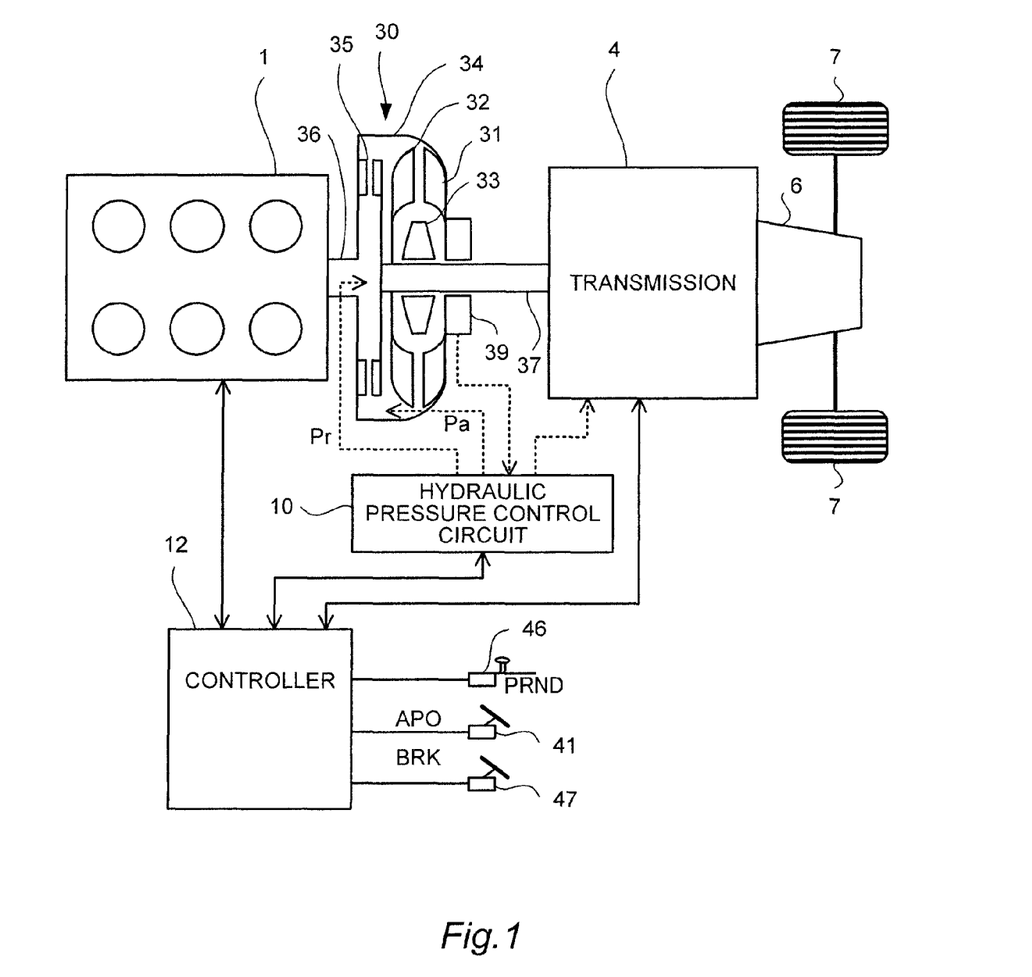
FIG. 1 is an explanatory diagram showing a driving device and a control device for a vehicle according to an embodiment of the present invention.

FIG. 1 is an explanatory diagram showing a driving device and a control device for a vehicle pertaining to a device for controlling a start of a vehicle according to an embodiment of the present invention.

An engine 1 is mounted on the vehicle. The output of the engine 1 is output from a crankshaft 36 and input to a torque converter 30 coupled to the crankshaft 36. The torque converter 30 includes a lock-up clutch 35. The output of the torque converter 30 is input to a transmission 4 via a transmission input shaft 37. The output of the transmission 4 causes drive wheels 7 to rotate via a final speed reduction device 6.

The vehicle includes a hydraulic pressure control circuit 10 that controls operations of the torque converter 30 and the transmission 4 by controlling a hydraulic pressure supplied thereto. The vehicle also includes a controller 12 that controls operations of the hydraulic pressure control circuit 10.

Signals from an accelerator pedal opening sensor 41, an inhibitor switch 46, and a brake sensor 47 are input to the controller 12. The accelerator pedal opening sensor 41 detects an amount of operation on an accelerator pedal by a driver (an accelerator pedal opening APO). The inhibitor switch 46 detects a state of operation on a shift lever by the driver. The brake sensor 47 detects an amount of operation on a brake pedal (a brake pedal depression amount), BRK.

The engine 1 inputs signals of a throttle valve opening TVO, an engine speed Ne, an engine torque Trq, and the like to the controller 12.

The transmission 4 inputs a transmission input rotation speed Ni and a transmission output rotation speed No to the controller 12. A vehicle speed VSP is input by multiplying the transmission output rotation speed No by predetermined coefficients, such as a final speed reduction ratio, a tire diameter, and the like.

The controller 12 determines a target transmission gear ratio of the transmission 4 from detected values, such as the accelerator pedal opening APO and the vehicle speed VSP, and outputs an instruction to the hydraulic pressure control circuit 10 based on the result of the determination so that an actual transmission gear ratio of the transmission 4 matches the target transmission gear ratio. The transmission 4 may be a step transmission, or may be a continuously variable transmission.

The controller 12 determines an engagement state of the lock-up clutch 35 of the torque converter 30, and outputs an instruction for controlling the engagement state of the lock-up clutch 35 to the hydraulic pressure control circuit 10 based on the result of the determination.

The torque converter 30 includes a pump impeller 31, a turbine runner 32, and a stator 33, which serve as an input element, an output element, and a reaction force element, respectively.

The pump impeller 31 is driven by a driving force from the engine 1 via a torque converter cover 34. The turbine runner 32 is provided in a converter chamber formed by the pump impeller 31 and the torque converter cover 34, and arranged to oppose the pump impeller 31. The stator 33 is interposed between an inner periphery of the pump impeller 31 and an inner periphery of the turbine runner 32.

In the torque converter 30, the pump impeller 31 rotated by the engine 1 agitates a working fluid, the turbine runner 32 is driven by a reaction force of the stator 33 while increasing torque, and the output from the turbine runner 32 is transmitted to the transmission 4 via the transmission input shaft 37.

When a torque increase and absorption of a torque fluctuation are unnecessary, the torque converter 30 directly couples the pump impeller 31 and the turbine runner 32 to each other mechanically by placing the lock-up clutch 35 in an engaged state.

An oil pump 39 is provided between the torque converter 30 and the transmission 4. The oil pump 39 is coupled to an end portion of the torque converter cover 34, and generates a hydraulic pressure by being rotated by the driving force of the engine 1. The generated hydraulic pressure is supplied to the hydraulic pressure control circuit 10.

The hydraulic pressure control circuit 10 controls an apply pressure Pa supplied to a converter chamber side, and a release pressure Pr supplied to a lock-up clutch side. An engagement force of the lock-up clutch 35 is controlled using a differential pressure between the apply pressure and the release pressure (Pa−Pr).

Figure 2:
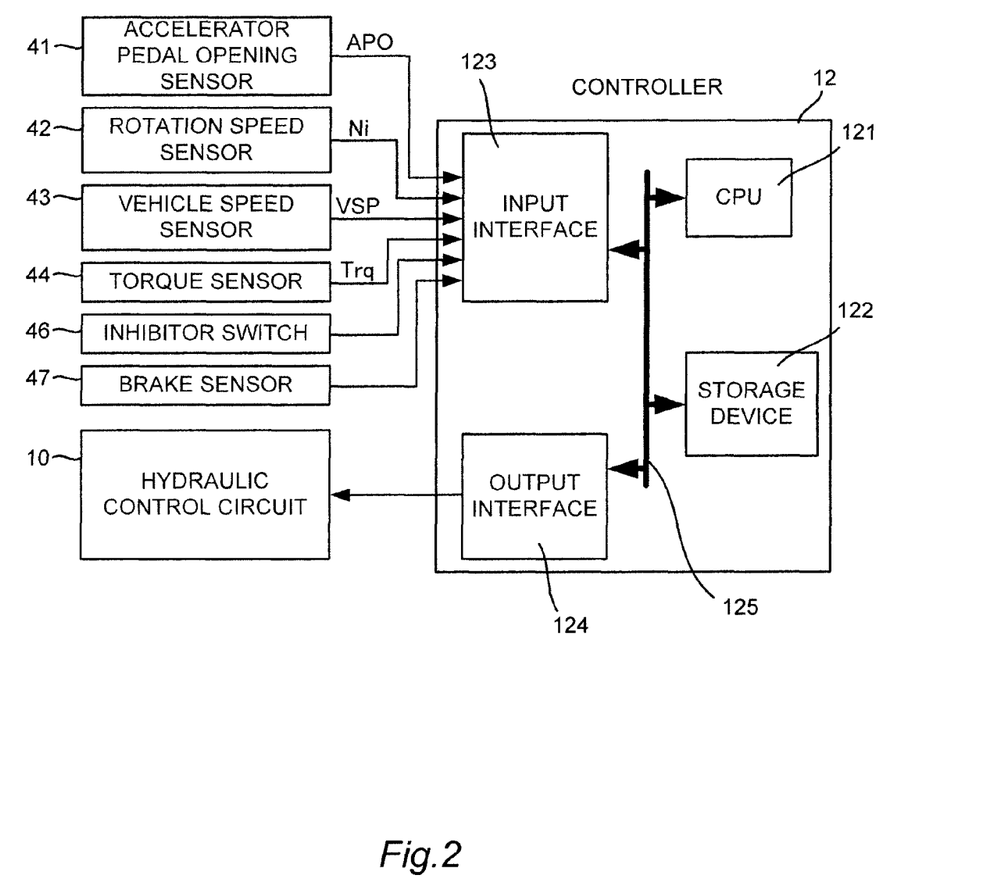
FIG. 2 is a functional block diagram focusing on a controller according to the embodiment of the present invention.

FIG. 2 is a functional block diagram focusing on the controller 12.

As shown in FIG. 2, the controller 12 is composed of a CPU 121, a storage device 122 made up of a RAM and a ROM, an input interface 123, an output interface 124, and a bus 125 connecting them to one another.

An output signal of the accelerator pedal opening sensor 41, an output signal from the transmission 4 (the transmission input rotation speed Ni, the transmission output rotation speed No, the vehicle speed VSP, etc.), a signal of the engine torque Trq from a torque sensor 44 of the engine 1, an input signal from the brake sensor 47, an output signal of the inhibitor switch 46, and the like are input to the input interface 123. The accelerator pedal opening sensor 41 detects the opening of the accelerator pedal (the accelerator pedal opening APO). The brake sensor 47 detects depression of the brake pedal and a fluid pressure of a brake fluid. The inhibitor switch 46 detects a position of a selector lever.

The storage device 122 stores therein a speed conversion control program for the transmission 4, and a speed conversion map used by the speed conversion control program. The CPU 121 reads and executes the speed conversion control program stored in the storage device 122, generates instructional signals by applying various types of calculation processing to various types of signals input via the input interface 123, and outputs the generated instructional signals to the hydraulic pressure control circuit 10 via the output interface 124. Various types of values used by the CPU 121 in the calculation processing, as well as the result of the calculation, are stored into the storage device 122 as appropriate.

The hydraulic pressure control circuit 10 is composed of a plurality of flow channels and a plurality of hydraulic pressure control valves. Based on the instructional signals from the controller 12, the hydraulic pressure control circuit 10 switches between hydraulic pressure supply passages by controlling the plurality of hydraulic pressure control valves, prepares a necessary hydraulic pressure from the hydraulic pressure generated by the oil pump 39, and supplies the prepared hydraulic pressure to components of the transmission 4 and the torque converter 30. Consequently, the transmission 4 performs speed conversion.

The hydraulic pressure control circuit 10 controls a torque capacity of the lock-up clutch 35 based on an instruction from the controller 12.

Specifically, when the apply pressure Pa<the release pressure Pr holds, the lock-up clutch 35 is not engaged, that is to say, the torque converter 30 is in a converter state. When the apply pressure Pa>the release pressure Pr holds, the engagement force of the lock-up clutch 35 increases in accordance with the differential pressure (Pa−Pr), and the lock-up clutch 35 is in a fully engaged state without slipping at a predetermined different pressure or higher. The engagement force of the lock-up clutch 35 causes generation of the torque capacity, which is torque transmittable by the lock-up clutch 35.

At the predetermined differential pressure or lower, the lock-up clutch 35 is in a slip engagement state where a differential rotation is produced by an input rotation speed (equivalent to the engine speed Ne) and an output rotation speed (equivalent to the transmission input rotation speed Ni) of the torque converter 30.

A description is now given of operations of the above-configured vehicle when starting.

The vehicle according to the embodiment of the present invention performs control to place the lock-up clutch 35 of the torque converter 30 in the slip engagement state when the vehicle starts.

By performing control for the slip engagement state when starting, torque of the engine 1 is transmitted via the lock-up clutch 35 in parallel with transmission via the torque converter 30. In this way, the torque transmission efficiency of the engine 1 is improved, and an increase in the rotation speed of the engine 1 is suppressed. As a result, the fuel efficiency can be improved.

Incidentally, when the vehicle starts, the load at the time of the start of the vehicle may vary significantly depending on a road condition and a vehicle condition. The vehicle load is increased, for example, when a road surface has a large inclination, when a live load of the vehicle is large, while towing another vehicle, and when starting on a road with a sharp curve with a large steering angle.

The torque amplification effect of the torque converter 30 diminishes when slip control is performed for the lock-up clutch 35. Therefore, if slip control is performed when starting under the foregoing high-load conditions, an actual driving force decreases relative to a request for a driving force. As a result, the torque capacity of the lock-up clutch 35 becomes overabundant, and the engine speed Ne decreases (is pulled down). This triggers shock and lowers acceleration of the vehicle, thus giving rise to the possibility of causing discomfort to the driver.

In view of this, when the high vehicle load is detected, for example, by an inclination sensor, through position detection using a GPS, and by a load sensor of the vehicle, the torque capacity can be controlled in accordance with the load. However, it is difficult to use detected values of these sensors in controlling a minute torque capacity when the vehicle starts. The cost for mounting these sensors will also increase.

In the embodiment of the present invention, regardless of an increase in the vehicle load, the driver's discomfort is prevented by controlling the engagement force of the lock-up clutch 35 in the following manner when the vehicle starts.

So-called start slip control will now be described. In this control, the lock-up clutch 35 is placed in the slip engagement state when starting. When the driver starts the vehicle by releasing a brake pedal and depressing the accelerator pedal from a stopped state in which the brake pedal is depressed, the controller 12 outputs a hydraulic pressure instruction so as to increase the torque capacity of the lock-up clutch 35 based on determination about the release of the brake pedal, and starts the vehicle while the lock-up clutch 35 is slipping. Once the vehicle has started, the torque capacity of the lock-up clutch 35 is controlled such that a slip amount of the lock-up clutch 35 gradually decreases as the vehicle speed increases, and at a predetermined vehicle speed, the slip amount becomes zero, that is to say, the lock-up clutch is placed in a fully engaged state.

As such, the start slip control denotes control whereby the lock-up clutch 35 is controlled based on determination about the release of the brake pedal, and is fully engaged by gradually decreasing the slip amount as the vehicle speed increases.

Figure 3:
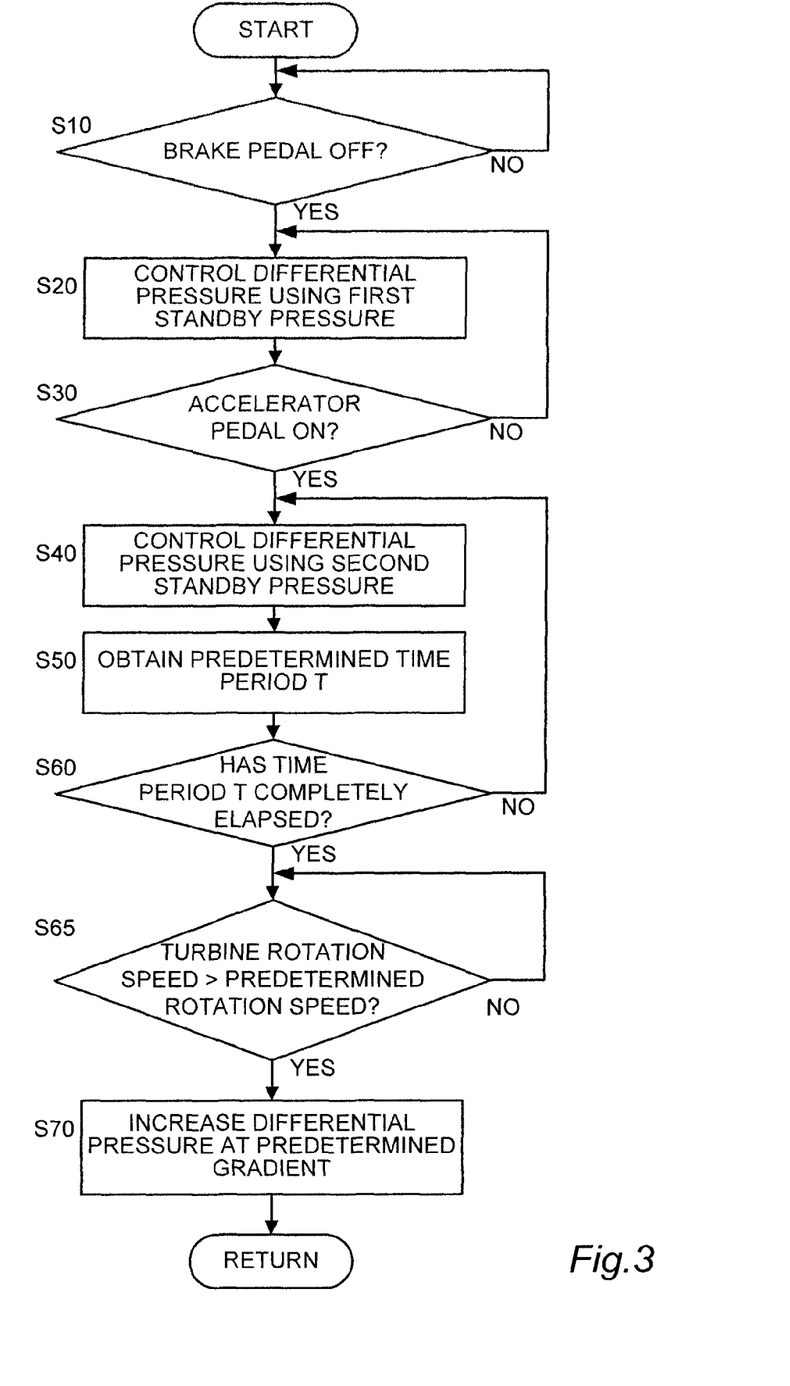
FIG. 3 is a flowchart of vehicle start control according to the embodiment of the present invention.

FIG. 3 is a flowchart of vehicle start control performed by the controller 12 according to the embodiment of the present invention.

The flowchart shown in FIG. 3 is executed by the controller 12 in parallel with other processing executed by the controller 12 when a stopped state of the vehicle is detected.

First, the controller 12 determines whether or not the driver has released depression of the brake pedal (whether or not the driver's foot has been lifted off the brake pedal) based on a signal from the brake sensor 47 (S10). If the brake pedal is depressed, the controller 12 waits while repeating step S10. In the embodiment of the present invention, an interval from release of the brake pedal to depression of the accelerator pedal is referred to as a first phase.

If it is determined that the driver's foot has been lifted off the brake sensor 47, it is determined that the driver's instruction for starting the vehicle has been detected. Then, processing proceeds to step S20, and the controller 12 outputs an instruction to the hydraulic pressure control circuit 10 such that a differential pressure of the lock-up clutch 35 (Pa−Pr) matches a first standby pressure. In response to the output instruction, the hydraulic pressure control circuit 10 controls a hydraulic pressure supplied to the lock-up clutch 35 such that the differential pressure matches the first standby pressure.

The first standby pressure is for preparing the lock-up clutch 35 in a state where the lock-up clutch 35 does not have a torque capacity yet. For example, the differential pressure is controlled to the extent that the torque capacity is not generated by bringing frictional facings of the lock-up clutch 35 into proximity to each other by way of control for setting a slightly low release pressure Pr relative to the apply pressure Pa.

Next, based on a signal input from the accelerator pedal opening sensor 41, the controller 12 determines whether or not an accelerator operation has been switched from OFF to ON due to the driver depressing the accelerator pedal (S40).

If the accelerator pedal is not depressed, the controller 12 returns to step S20 and maintains the lock-up clutch 35 at the first standby pressure.

If it is determined that the accelerator pedal has been depressed, it is determined that the driver's request for a driving force has been detected. Then, processing proceeds to step S40, and the controller 12 issues an instruction for a second standby pressure that is higher than the first standby pressure set in step S30.

The second standby pressure is for preparing the lock-up clutch 35 in a state where the lock-up clutch 35 does not have a torque capacity yet. With the second standby pressure, control is performed to the extent that the torque capacity is not generated by bringing the frictional facings of the lock-up clutch 35 into closer proximity to each other by way of control for setting a minute difference between the apply pressure Pa and the release pressure Pr, and to the extent that the lock-up clutch 35 starts to have the torque capacity when the differential pressure exceeds the second standby pressure.

Next, the controller 12 proceeds to step S50, and obtains a predetermined time period T by referring to a time setting value map based on the accelerator pedal opening APO and the engine torque Trq. Then, processing proceeds to step S60, and the controller 12 determines whether or not the obtained predetermined time period T has completely elapsed.

The predetermined time period T is set by the controller 12 referring to a time setting map based on the accelerator pedal opening APO and an accelerator pedal opening speed ΔAPO at the time when the accelerator pedal is operated by the driver.

If the predetermined time period T has not completely elapsed, processing returns to step S40, and the controller 12 maintains the differential pressure of the lock-up clutch 35 set in step S40.

At this time, in the case where the value of the predetermined time period T obtained by referring to the time setting value map in step S50 has changed due to changes in the accelerator pedal opening APO and the engine torque Trq, a new predetermined time period T is set only if the value of the predetermined time period T obtained for the first time has increased (the predetermined time period has extended). If the driving force is determined to be small due to an operation of returning the accelerator pedal, the predetermined time period T is shortened. However, re-setting the shortened predetermined time period T advances the time at which the lock-up clutch 35 starts to have the torque capacity, and pulls down the engine speed Ne, thereby triggering shock. By setting the new predetermined time period T in the above-described manner, such occurrence of shock is prevented.

In the embodiment of the present invention, an interval from the issuance of a start request for the vehicle through detection of depression of the accelerator pedal to the complete elapse of the predetermined time period T is referred to as a second phase.

If it is determined that the predetermined time period T has completely elapsed, processing proceeds to step S65, and the controller 12 determines whether or not a turbine rotation speed Nt of the torque converter 30 is higher than a predetermined rotation speed. If it is determined that the turbine rotation speed Nt is higher than the predetermined rotation speed, processing proceeds to step S70. If the turbine rotation speed Nt is lower than the predetermined rotation speed, the controller 12 waits while repeating the present step S65.

The predetermined rotation speed in step S65 is decided in consideration of output torques of the torque converter 30, the lock-up clutch 35 and the engine 1, the vehicle load, and the like, to the extent that shock is not triggered as a result of pulling down the engine speed Ne, even when the lock-up clutch 35 has the torque capacity due to an increase in the turbine rotation speed Nt while the torque converter 35 is in the converter state, and so as not to cause a rapid increase in the engine speed Ne in association with an increase in the accelerator pedal opening APO. The predetermined rotation speed is set to, for example, 300 rpm.

In step S70, the controller 12 controls the lock-up clutch 35 toward an engagement side (the slip engagement state) by increasing the differential pressure of the lock-up clutch 35 (Pa−Pr) at a predetermined gradient C based on the accelerator pedal opening APO.

After step S70, when a predetermined condition (e.g., the lock-up clutch 35 has shifted from the slip engagement state to a lock-up state) is satisfied, processing of the present flow-chart is ended, and other processing of the controller 12 is executed. In the embodiment of the present invention, an interval from the complete elapse of the predetermined time period T to the engagement of the lock-up clutch 35 is referred to as a third phase.

Through the above-described control, the engagement force of the lock-up clutch 35 is controlled when the vehicle starts.

Figure 4:
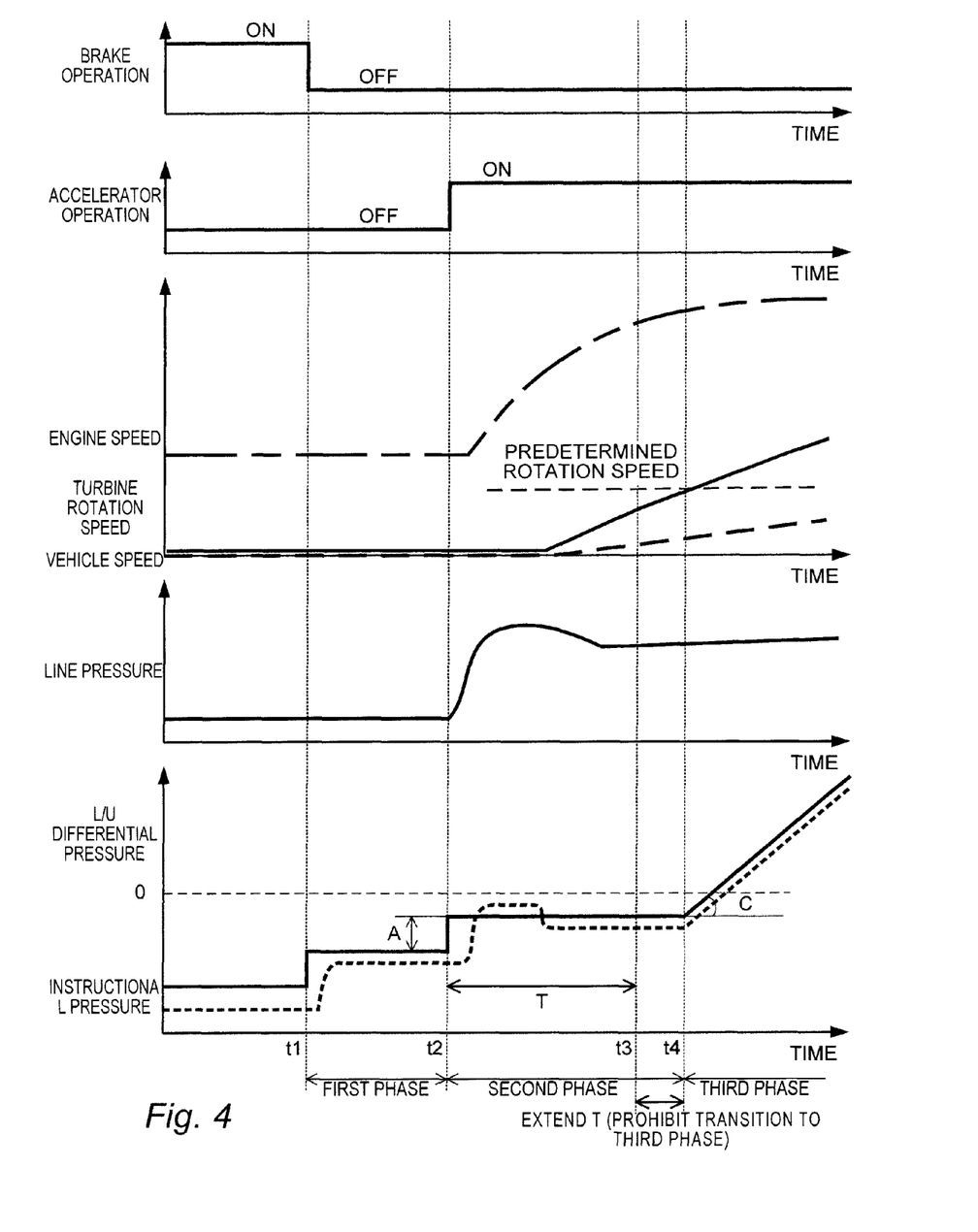
FIG. 4 is an explanatory diagram showing the vehicle start control according to the embodiment of the present invention.

FIG. 4 is an explanatory diagram showing the vehicle start control according to the embodiment of the present invention.

FIG. 4 shows, from the top row, an operation state of the brake pedal, an operation state of the accelerator pedal, the engine speed Ne, the turbine rotation speed Ntb, the vehicle speed VSP, a line pressure of the hydraulic pressure control circuit 10, and a state of the differential pressure (an instructional pressure) of the lock-up clutch 35.

While the vehicle is stopped, the brake pedal is depressed by the driver (a brake operation is ON). If the depression of the brake pedal is released by the driver at timing t1 (the brake operation is OFF), the controller 12 determines that the vehicle is intended to start. The brake pedal may be something that is manually operated (a lever and a switch).

At this time, the determination in step S10 of FIG. 3 results in YES, and the controller 12 controls the differential pressure of the lock-up clutch 35 using the first standby pressure through the process of step S20 (the first phase).

Next, if the accelerator pedal is depressed by the driver (the accelerator operation is ON), the controller 12 determines that the vehicle is intended to accelerate.

At this time, the determination in step S30 of FIG. 3 results in YES, and the controller 12 controls the lock-up clutch 35 using the second standby pressure that is higher than the first standby pressure through the process of step S40. The control using the second standby pressure is performed until the complete elapse of the predetermined time period T (the second phase).

Depression of the accelerator pedal by the driver causes the engine speed Ne to increase. As the engine speed Ne increases, a driving force of the oil pump 39 and the line pressure increase. Consequently, an actual differential pressure (indicated by a dash line) transiently increases relative to an instructional pressure (indicated by a solid line) for the differential pressure of the lock-up clutch 35. An upper limit value of the second standby pressure is controlled such that the lock-up clutch 35 does not have the torque capacity even when the actual differential pressure has increased in the above manner.

Upon the complete elapse of the predetermined time period T at timing t3, the determination in step S60 of FIG. 3 results in YES, and the controller 12 determines in step S65 whether or not the turbine rotation speed Nt has exceeded the predetermined rotation speed. If the turbine rotation speed Nt has not exceeded the predetermined rotation speed, even after the predetermined time period T has completely elapsed, the predetermined time period T is extended until the turbine rotation speed Nt exceeds the predetermined rotation speed, and the control in the second phase, that is to say, the second standby pressure is maintained without making a transition to the third phase.

If the turbine rotation speed Nt exceeds the predetermined rotation speed at timing t4, the determination in step S65 of FIG. 3 results in YES, and the controller 12 performs control until the lock-up clutch 35 is engaged while increasing the differential pressure of the lock-up clutch 35 at the predetermined gradient C based on the accelerator pedal opening APO (the third phase).

Specifics of the second standby pressure in step S40 of FIG. 3 will now be described.

The controller 12 controls engagement of the lock-up clutch 35 by controlling the differential pressure of the lock-up clutch 35. At this time, in the second phase, the controller 12 does not immediately place the lock-up clutch 35 in an engaged state, but waits for the predetermined time period T in a state where the lock-up clutch 35 is yet to start having the torque capacity (the second standby pressure).

It will be assumed that this second standby pressure is a value obtained by adding a predetermined value A to the first standby pressure. The predetermined value A is set based on the accelerator pedal opening APO.

For example, in the case where the accelerator pedal opening APO is small (e.g., smaller than 1/8), the predetermined value A is set to zero, and the second standby pressure is maintained at the first standby pressure until the complete elapse of the predetermined time period T, even in the second phase.

In the case where the accelerator pedal opening APO is large (e.g., 1/8 or larger), the predetermined value A is set in accordance with the accelerator pedal opening APO in a range between the first standby pressure and a maximum value of the second standby pressure. The second standby pressure is set to a value obtained by adding the set A to the first standby pressure. Upon transition to the second phase (when the accelerator operation is switched ON), a shift to the second standby pressure is realized in a stepwise manner.

The maximum value of the second standby pressure is set to a maximum differential pressure at which the lock-up clutch 35 does not have the torque capacity, even with the presence of variations in the instructional differential pressure and the actual differential pressure, in a state where the line pressure of the hydraulic pressure control circuit 10 has increased as a result of switching the accelerator operation ON and driving the oil pump 39. By setting the second standby pressure in the above manner, control can be performed such that the lock-up clutch 35 does not have the torque capacity even when the line pressure has increased. Consequently, during the second phase, the engine speed Ne is prevented from being pulled down.

Alternatively, instead of adding the predetermined value A to the first standby pressure, the differential pressure may be controlled to gradually increase from the first standby pressure to the second standby pressure between timing t1 and timing t2 by multiplying the first standby pressure by a predetermined gradient B.

A description is now given of obtainment of the predetermined time period T in step S50 of FIG. 3.

Figure 5A:
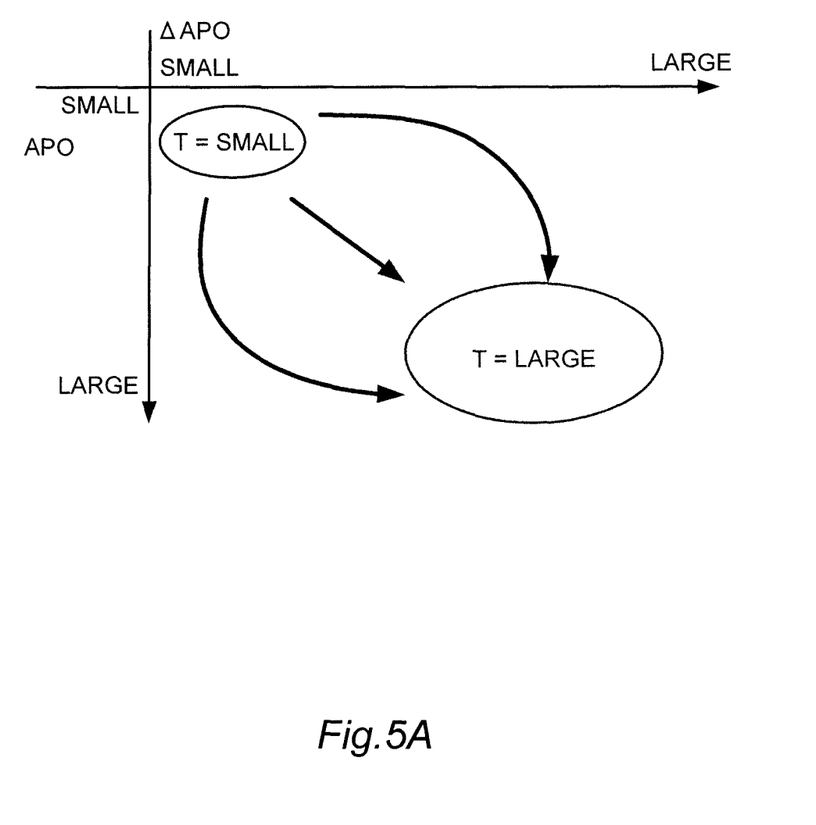
FIG. 5A shows an example of a map for obtaining a predetermined time period T according to the embodiment of the present invention.
Figure 5B:
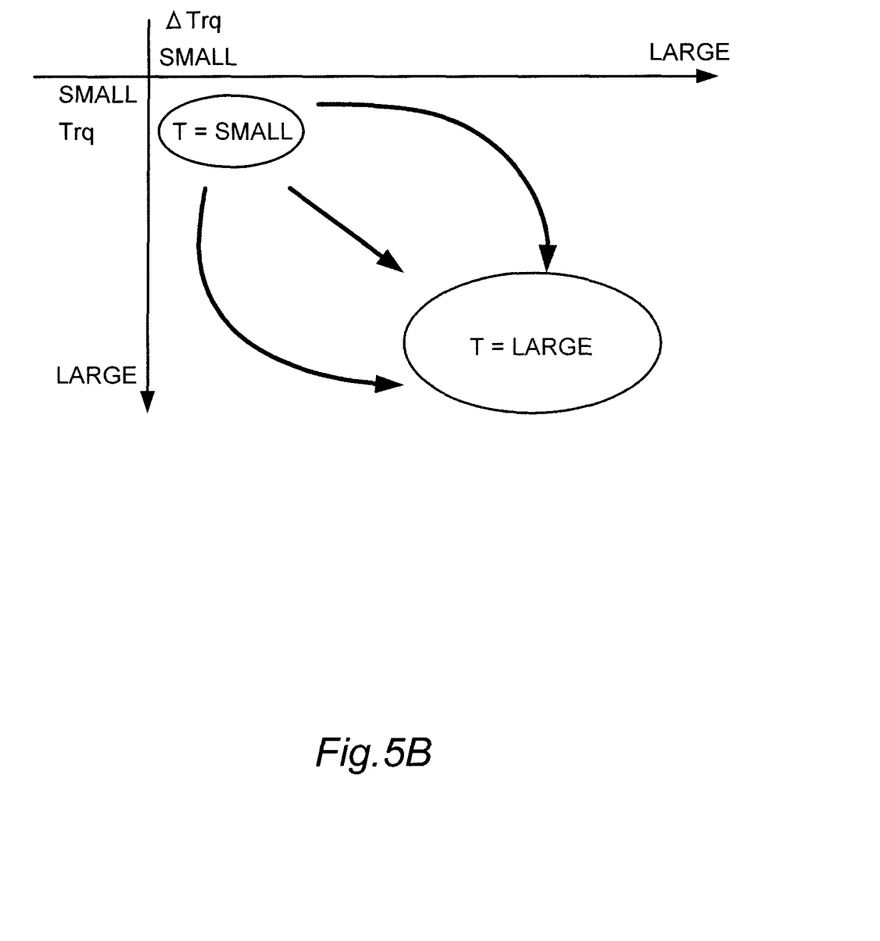
FIG. 5B shows an example of a map for obtaining the predetermined time period T according to the embodiment of the present invention.

FIGS. 5A and 5B show examples of a map for obtaining the predetermined time period T according to the embodiment of the present invention.

FIG. 5A shows one example of a time setting map indicated by the accelerator pedal opening APO and an amount of temporal change in the accelerator pedal opening APO (the accelerator pedal opening speed ΔAPO). FIG. 5B shows one example of a time setting map indicated by output torque Trq of the engine and an amount of temporal change in the output torque of the engine (the engine torque change speed ΔTrq).

The controller 12 obtains the predetermined time period T with reference to the time setting map shown in FIG. 5A based on the accelerator pedal opening APO and the accelerator pedal opening speed ΔAPO at timing t1, that is to say, at the time when the driver operates the accelerator pedal.

In the time setting map shown in FIG. 5A, the predetermined time period T is set such that it increases as the accelerator pedal opening APO increases and as the accelerator pedal opening speed ΔAPO increases.

The larger the accelerator pedal opening APO, the higher the engine speed Ne, and the higher the line pressure. Therefore, by setting a long predetermined time period T in accordance with the magnitude of the line pressure, the engine speed Ne is prevented from being pulled down significantly due to an increase in the torque capacity of the lock-up clutch 35 triggered by the increase in the line pressure.

When the accelerator pedal opening APO is large but the accelerator pedal opening speed ΔAPO is low, the actual hydraulic pressure conforms with the instructional pressure (without overshooting), and the torque capacity does not become overabundant. Therefore, when the accelerator pedal opening speed ΔAPO is small, a short predetermined time period T is set.

Conversely, when the accelerator pedal opening APO is small but the accelerator pedal opening speed ΔAPO is high, the actual hydraulic pressure can no longer conform with the instructional pressure, and the torque capacity becomes overabundant in proportion to the overshoot. Therefore, when the accelerator pedal opening speed ΔAPO is high, a long predetermined time period T is set.

The controller 12 may also obtain the predetermined time period T with reference to the time setting map shown in FIG. 5B based on the engine torque Trq and the engine torque change speed ΔTrq obtained from the engine 1 at timing t1.

In the time setting map shown in FIG. 5B, the predetermined time period T is set such that it increases as the engine torque Trq increases and as the engine torque change speed ΔTrq increases.

Similarly to the accelerator pedal opening APO of FIG. 5A explained earlier, the larger the engine torque generated by the engine 1 based on the accelerator pedal opening APO, the higher the line pressure. Therefore, by setting a long predetermined time period T in accordance with the magnitude of the high line pressure, the engine speed Ne is prevented from being pulled down significantly due to an increase in the torque capacity of the lock-up clutch 35 triggered by the increase in the line pressure.

When the engine torque Trq is large but the engine torque change speed ΔTrq is low, the actual hydraulic pressure conforms with the instructional pressure (without overshooting), and the torque capacity does not become overabundant. Therefore, when the engine torque change speed ΔTrq is small, a short predetermined time period T is set.

Conversely, when the engine torque Trq is small but the engine torque change speed ΔTrq is high, the actual hydraulic pressure can no longer conform with the instructional pressure, and the torque capacity becomes overabundant in proportion to the overshoot. Therefore, when the engine torque change speed ΔTrq is high, a long predetermined time period T is set.

In this way, the controller 12 obtains the predetermined time period T based on the accelerator pedal opening APO and the accelerator pedal opening speed ΔAPO, or based on the engine torque Trq and the engine torque change speed ΔTrq, at timing t1.

The predetermined time period T may be obtained based on one or both of the time setting maps shown in FIGS. 5A and 5B.

More specifically, the controller 12 obtains the accelerator pedal opening APO from the accelerator pedal opening sensor, and obtains the engine torque Trq from a signal that is calculated by and output from the inside of the engine 1 (e.g., an engine controller unit). This offers an advantage that an accelerator pedal opening APO signal can be obtained sooner than an engine torque Trq signal. As the value of the engine torque Trq has been corrected through calculation by the engine 1, the engine torque Trq signal has lower accuracy than the accelerator pedal opening APO signal. On the other hand, in terms of detection of the magnitude of the request for the driving force, a calculated value of the predetermined time period T is more accurate when the engine torque Trq that directly indicates the magnitude of the driving force is used.

The following describes control for increasing the differential pressure of the lock-up clutch 35 at a predetermined gradient in the third phase.

Figure 6:
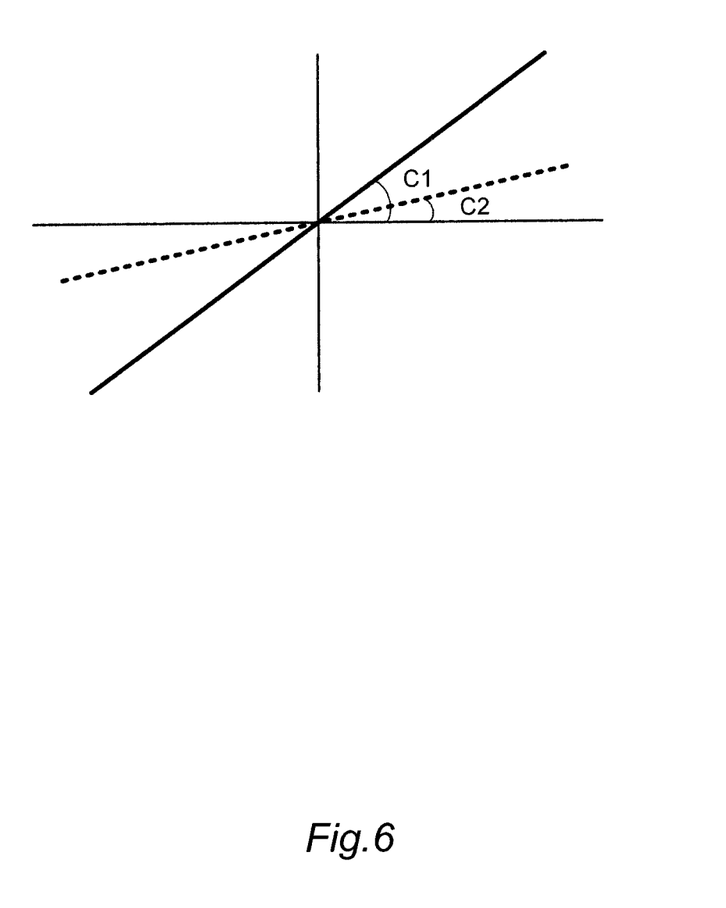
FIG. 6 is an explanatory diagram showing the settings of a predetermined gradient C according to the embodiment of the present invention.
Figure 7:
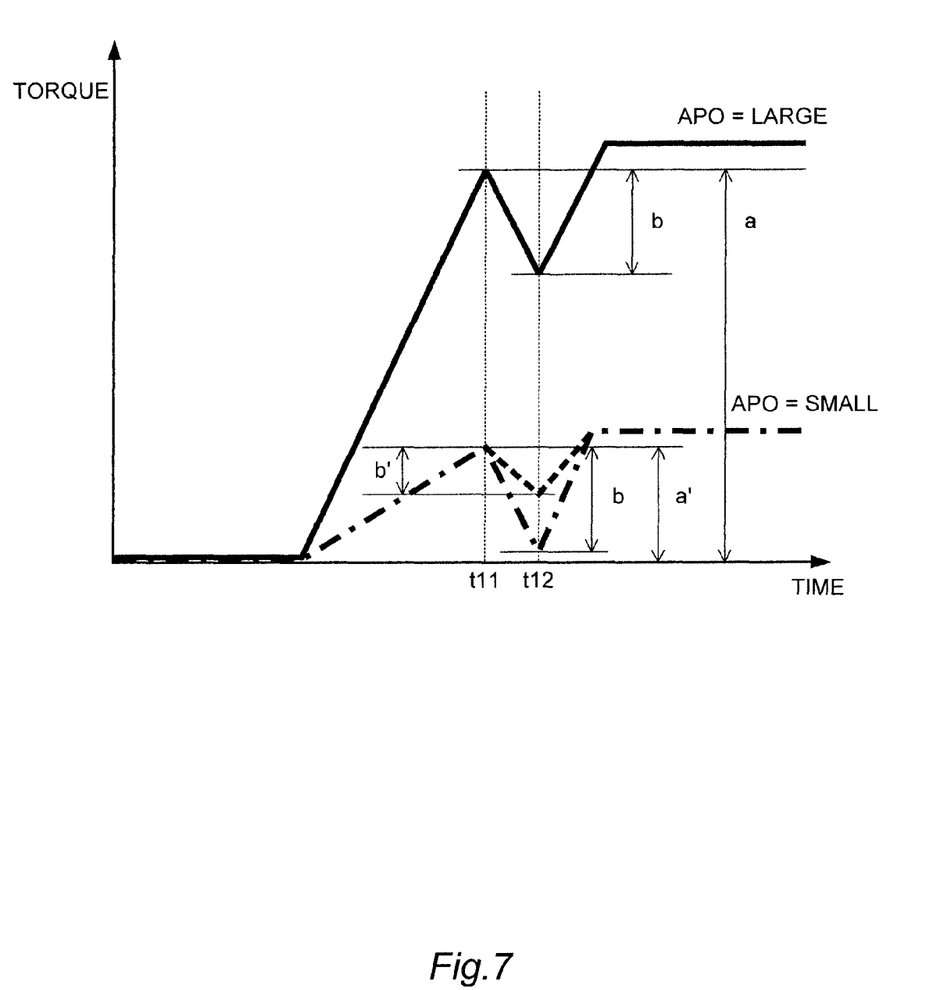
FIG. 7 is an explanatory diagram showing the settings of the gradient C according to the embodiment of the present invention.

FIGS. 6 and 7 are explanatory diagrams showing the settings of the predetermined gradient C in the third phase according to the embodiment of the present invention. FIG. 6 is an explanatory diagram showing the gradient C, and FIG. 7 is an explanatory diagram showing the settings of the gradient C.

In the third phase, the controller 12 controls the differential pressure of the lock-up clutch 35 to increase at the predetermined gradient C based on the accelerator pedal opening APO.

When the lock-up clutch 35 has the torque capacity as a result of increasing the differential pressure thereof, the torque decreases (the torque is pulled down) due to transmission of the engine speed Ne via the lock-up clutch 35.

In FIG. 7, a solid line shows a change in the torque when the accelerator pedal is depressed with a relatively large accelerator pedal opening APO (e.g., 4/8) from a state in which the accelerator pedal is released, whereas a dash-and-dot line shows a change in the torque when the accelerator pedal is depressed with a relatively small accelerator pedal opening APO (e.g., 1/8) from a state in which the accelerator pedal is released.

FIG. 7 indicates that the lock-up clutch 35 starts to have the torque capacity at timing t11, and the lock-up clutch 35 has a maximum torque capacity and is placed in an engaged state at timing t12.

At timing t12, the magnitude by which the torque is pulled down due to the torque capacity of the lock-up clutch 35 is substantially constant (b) regardless of the magnitude of the accelerator pedal opening APO.

Therefore, when the accelerator pedal opening APO is large, the magnitude by which the torque is pulled down is a ratio between torques a and b (b/a). On the other hand, when the accelerator pedal opening APO is small, the magnitude by which the torque is pulled down is a ratio between torques a' and b (b/a'). Here, (b/a')>(b/a) holds. Therefore, if the value of the gradient C is fixed (C1), a small accelerator pedal opening APO would cause the torque to be pulled down significantly and trigger shock in the vehicle, thereby causing discomfort to the driver.

In view of this, when the accelerator pedal opening APO is small, the gradient C is set to C2 of a smaller value so as to reduce the magnitude by which the torque is pulled down. Provided that the torque is pulled down by b' when the gradient C is set to the gradient C2, C2 is set so that (b'/a')≈(b/a) holds.

In this way, the controller 12 sets the gradient C in the third phase based on the magnitude of the accelerator pedal opening APO, such that a ratio between the torque of the engine 1 and the magnitude by which the torque is pulled down at the time when the lock-up clutch 35 has the torque capacity is substantially constant.

As set forth above, the embodiment of the present invention is applied to a vehicle in which the output from the engine 1, which is a driving force source, is output from the transmission 4 via the torque converter 30 including the lock-up clutch 35. The controller 12 functions as a start request detection unit, an engagement control unit, and a rotation speed detection unit. The start request detection unit detects a start request for the vehicle in accordance with a state of the brake pedal or the accelerator pedal. The engagement control unit controls torque that is transmittable by the lock-up clutch by issuing an instruction to the hydraulic pressure control circuit 10 that controls the engagement force of the lock-up clutch 35. The rotation speed detection unit detects the turbine rotation speed Nt, which is the output rotation speed of the torque converter.

The controller 12 issues an instruction to the hydraulic pressure control circuit 10 such that the lock-up clutch 35 is able to transmit torque when the following conditions are both satisfied: the predetermined time period T has elapsed since the detection of the start request; and the turbine rotation speed Nt of the torque converter 30 has increased to a predetermined rotation speed or higher. In other words, even after the predetermined time period T has elapsed since the detection of the start request, transmission of torque by the lock-up clutch 35 is prohibited until the turbine rotation speed Nt of the torque converter 30 increases to the predetermined rotation speed or higher.

In this configuration, by performing control such that the lock-up clutch 35 does not transmit torque until the turbine rotation speed Nt becomes equal to or higher than a predetermined rotation, the lock-up clutch 35 is controlled to transmit torque after the driving force of the engine 1 starts to be transmitted via the torque converter 30. Consequently, a timing at which the lock-up clutch 35 starts to transmit torque occurs under a substantially fixed condition, regardless of the state of the vehicle load. Therefore, regardless of the vehicle load and a road surface condition, a stable driving force can be transmitted in slip control for the lock-up clutch 35 when starting, and driving performance can be improved.

The controller 12 instructs the hydraulic pressure control circuit 10 about a standby pressure for preparing the lock-up clutch 35 to be able to transmit torque until the following conditions are both satisfied: the predetermined time period T has elapsed since the detection of the start request; and the turbine rotation speed Nt of the torque converter 30 has increased to the predetermined rotation speed or higher. The instruction about the standby pressure is control that is ordinarily performed at the time of engagement of the lock-up clutch 35. By performing control to wait for a predetermined time period at the standby pressure, shock can be prevented when the vehicle starts.

The controller 12 functions as a driving force request detection unit that detects a request for a driving force based on the accelerator pedal opening APO and the engine torque Trq. The controller 12 sets a longer predetermined time period T for a larger driving force requested. That is to say, a request for a large driving force of the engine 1 boosts an increase in the line pressure of the hydraulic pressure control circuit 10. In view of this, by setting a longer predetermined time period T, i.e., a longer waiting time period for a larger driving force requested, the actual hydraulic pressure is prevented from increasing relative to the instructional pressure for the lock-up clutch 35. This makes it possible to prevent shock when the vehicle starts. The predetermined rotation speed, which is a threshold for the turbine rotation speed, is always set to a constant value regardless of the accelerator pedal opening APO and the like. This enables the lock-up clutch 35 to have the torque capacity always under a fixed condition, whether the vehicle load is large or small. Therefore, the engine rotation can be prevented from being pulled down or rapidly increasing.

The controller 12 increases an instructional value at the predetermined gradient C until the lock-up clutch 35 is able to transmit torque when the following conditions are both satisfied: the predetermined time period T has elapsed since the detection of the start request; and the turbine rotation speed Nt of the torque converter 30 has increased to the predetermined rotation speed or higher. The controller 12 also sets the predetermined gradient C such that the predetermined gradient C exhibits a larger changing gradient for a larger driving force requested. That is to say, in the case where a small driving force is requested, the instructional value is set to change moderately when causing the lock-up clutch 35 to have the torque capacity. This makes it possible to reduce shock triggered by pulling down the engine torque when a transmission capacity is present. In the case where a large driving force is requested, shock is alleviated due to an increase in the driving force when the lock-up clutch 35 has the torque capacity. This enables the lock-up clutch 35 to have the torque capacity at an earlier stage.

This concludes the description of the embodiment of the present invention. It should be noted that the above-described embodiment merely illustrates one application example of the present invention, and is not intended to restrict a technical scope of the present invention to specific configurations of the above-described embodiment.

For example, the transmission 4 may be a step transmission, and may be a continuously variable transmission in which a V-belt or a chain is wound around a pair of pulleys. Alternatively, the transmission 4 may also be a toroidal-type continuously variable transmission in which a tiltable power roller is arranged between an input disk and an output disk.

While the lock-up clutch 35 of the torque converter 30 is configured in the above-described embodiment such that the torque capacity is controlled using the differential pressure between the apply pressure Pa and the release pressure Pr, no limitation is intended in this regard. The lock-up clutch 35 may be a multiple-plate lock-up clutch. In this case, the second standby pressure can be considered as a pre-charge pressure in multiple-plate clutch control.

This application claims a priority of Japanese Patent Application No. 2012-76225 filed with the Japan Patent Office on Mar. 29, 2012, all the contents of which are hereby incorporated by reference.

Exclusive nature or features of the embodiments of this invention are claimed as follows.

The invention claimed is:

1. A device for controlling a start of a vehicle in which an output of a driving force source is output from a transmission via a torque converter including a lock-up clutch, the device comprising:
  a start request detection unit adapted to detect a start request for the vehicle;
  a hydraulic pressure control circuit adapted to control torque transmitted by the lock-up clutch by controlling an engagement force of the lock-up clutch when the vehicle starts;
  a rotation speed detection unit adapted to detect an output rotation speed of the torque converter;
  an elapse wait unit adapted to wait until a predetermined time period elapses since detection of the start request by the start request detection unit;
  an increase wait unit adapted to wait until the output rotation speed of the torque converter increases to a predetermined rotation speed or higher when the vehicle starts; and
  an engagement control unit adapted to issue an instruction to the hydraulic pressure control circuit such that the lock-up clutch is placed in slip engagement and is able to transmit the torque when the following conditions are both satisfied: the predetermined time period has elapsed since detection of the start request by the start request detection unit; and the output rotation speed has increased to the predetermined rotation speed or higher.

2. The device for controlling the start of the vehicle according to claim 1, wherein
  the engagement control unit prohibits the lock-up clutch from being placed in the slip engagement and transmitting the torque until the output rotation speed increases to the predetermined rotation speed or higher after the predetermined time period has elapsed since detection of the start request by the start request detection unit.

3. The device for controlling the start of the vehicle according to claim 1, wherein
  the engagement control unit instructs the hydraulic pressure control circuit about a standby pressure for preparing the lock-up clutch to be placed in the slip engagement and be able to transmit the torque until the following conditions are both satisfied: the predetermined time period has elapsed since detection of the start request by the start request detection unit; and the output rotation speed has increased to the predetermined rotation speed or higher.

4. The device for controlling the start of the vehicle according to claim 1, further comprising
  a driving force request detection unit adapted to detect a request for a driving force output from the driving force source, wherein
  the engagement control unit sets the predetermined time period such that the larger a requested driving force detected by the driving force request detection unit, the longer the predetermined time period, and sets the predetermined rotation speed to be constant regardless of a requested driving force.

5. The device for controlling the start of the vehicle according claim 1, wherein
  the engagement control unit
  increases an instructional value until the lock-up clutch is placed in the slip engagement and be able to transmit the torque when the following conditions are both satisfied: the predetermined time period has elapsed since detection of the start request by the start request detection unit; and the output rotation speed has increased to the predetermined rotation speed or higher, and
  increases the instructional value until the lock-up clutch is able to transmit the torque such that the larger a requested driving force, the larger a changing gradient of the instructional value.

6. A method for controlling a start of a vehicle in which an output of a driving force source is output from a transmission via a torque converter including a lock-up clutch, the method comprising:
  waiting for an elapse of a predetermined time period since detection of a start request for the vehicle;
  waiting until an output rotation speed of the torque converter increases to a predetermined rotation speed or higher when the vehicle starts;
  issuing an instruction to a hydraulic pressure control circuit such that the lock-up clutch is placed in slip engagement and is able to transmit torque when the following conditions are both satisfied: the predetermined time period has elapsed since detection of the start request for the vehicle; and the output rotation speed of the torque converter has increased to the predetermined rotation speed or higher; and
  controlling the torque transmitted by the lock-up clutch placed in the slip engagement by controlling an engagement force of the lock-up clutch based on the instruction.

7. A device for controlling a start of a vehicle in which an output of a driving force source is output from a transmission via a torque converter including a lock-up clutch, the device comprising:
  a start request detection means adapted to detect a start request for the vehicle;
  a hydraulic pressure control means adapted to control torque transmitted by the lock-up clutch by controlling an engagement force of the lock-up clutch when the vehicle starts;
  a rotation speed detection unit adapted to detect an output rotation speed of the torque converter;

an elapse wait means adapted to wait until a predetermined time period elapses since detection of the start request by the start request detection unit;

an increase wait means adapted to wait until the output rotation speed of the torque converter increases to a predetermined rotation speed or higher when the vehicle starts; and an engagement control means adapted to issue an instruction to the hydraulic pressure control circuit such that the lock-up clutch is placed in slip engagement and is able to transmit the torque when the following conditions are both satisfied: the predetermined time period has elapsed since detection of the start request by the start request detection unit; and the output rotation speed has increased to the predetermined rotation speed or higher.

* * * * *